H. N. SPEER.
BACK REST.
APPLICATION FILED JULY 5, 1919.
1,380,934. Patented June 7, 1921.
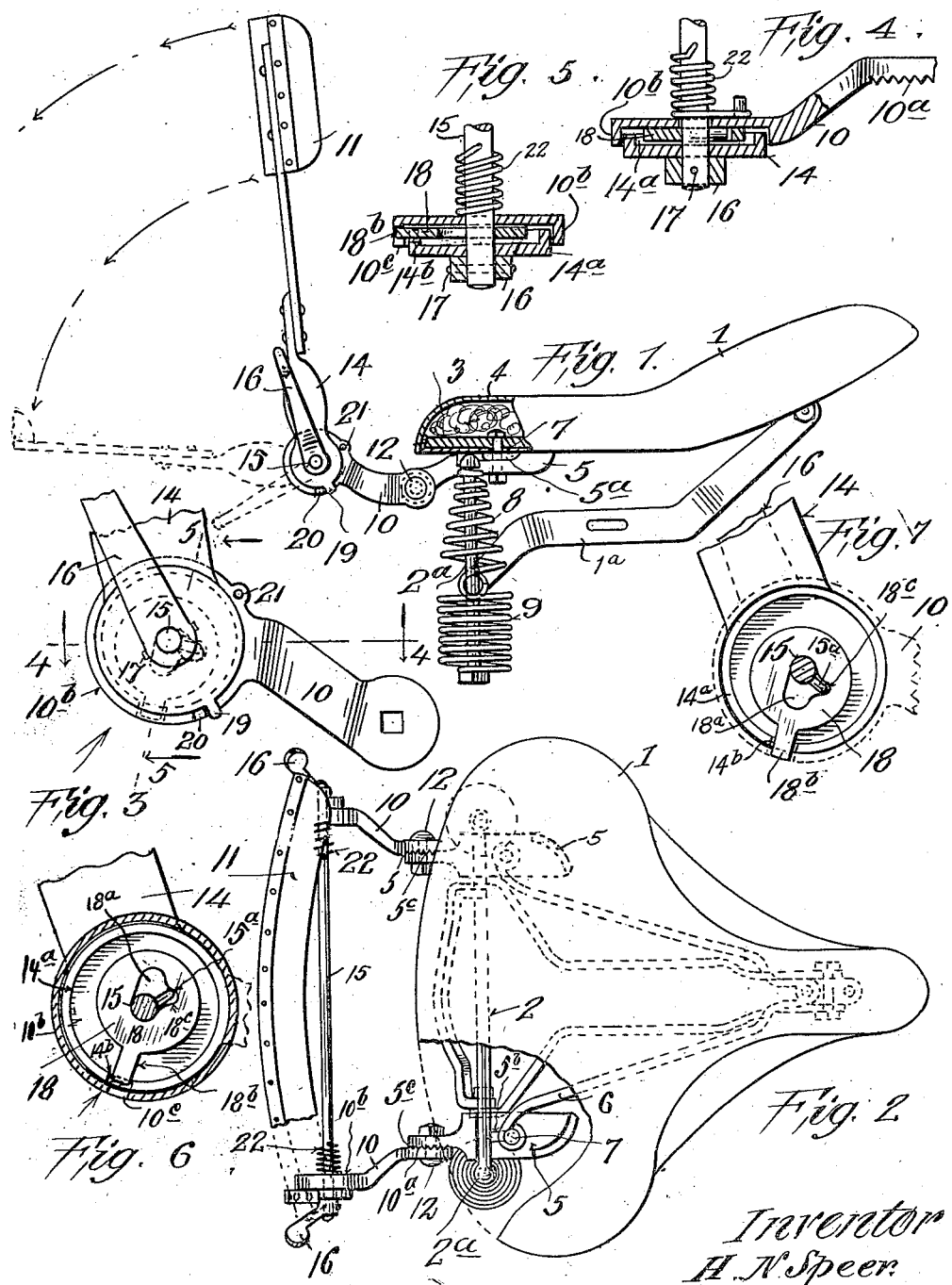
Inventor
H. N. Speer
by his atty P. F. Bourne

UNITED STATES PATENT OFFICE.

HORACE N. SPEER, OF SCARSDALE, NEW YORK.

BACK-REST.

1,380,934.   Specification of Letters Patent.   Patented June 7, 1921.

Application filed July 5, 1919. Serial No. 308,704.

*To all whom it may concern:*

Be it known that I, HORACE N. SPEER, a citizen of the United States, and resident of Scarsdale, in the county of Westchester and State of New York, have invented certain new and useful Improvements in Back-Rests, of which the following is a specification.

The object of my invention is to provide a back rest for seats of motor cycles, bicycles and the like which shall be simple in construction and readily applicable to different seats, and whereby the back rest may be adjusted and held in different positions in a simple and expeditious manner.

My invention comprises members attached to the seat, braces adjustably carried by said members, a back rest pivotally carried by said braces and means coöperative between said back rest and braces to retain the back rest in different positions of adjustment.

My invention also comprises novel details of improvement and combinations of parts that will be more fully hereinafter set forth and then pointed out in the claims.

Reference is to be had to the accompanying drawings forming a part hereof, wherein—

Figure 1 is a side view of a motor cycle seat equipped with my improvements;

Fig. 2 is a partly broken plan view thereof;

Fig. 3 is an enlarged detail side view;

Figs. 4 and 5 are cross sections respectively on lines 4—4 and 5—5 in Fig. 3;

Figs. 6 and 7 are detached detail views showing locking means for the back rest in different positions.

Similar numerals of reference indicate corresponding parts in the several views.

In the drawings the numeral 1 indicates a seat particularly adapted for motor cycles and is shown provided with a supporting member $1^a$, and a cross bar 2 beneath base 3 upon which the cover portion 4 is fitted, which parts are of ordinary or well known construction. At 5 are back rest supporting members which are spaced apart and clamped against base 3 and are provided with recessed portions $5^a$ receiving cross bar 2 and the forward rods 6 of the seat. Bolts 7 pass through said base and through slots $5^b$ in members 5, whereby the latter are secured to the under surface of the seat in an adjustable manner. In the example illustrated, cross bar 2 has depending arms $2^a$ for guiding the springs 8, 9. The members 5 project rearwardly and are adjustably attached to braces 10 which support the back rest 11. Said braces are shown provided with serrations or teeth $10^a$ coöperative with corresponding serrations or teeth $5^c$ along corresponding member 5, bolts 12 passing through said members and braces serving to retain said serrations or teeth in set position to secure said braces correspondingly. In the construction described the members 5 are attachable to different constructions of seats, and the braces 10 adjustably attached to said members afford a simple and convenient means for setting the back rest in desired relation to the seat. The back rest 11 is shown provided with depending arms 14 extending at the lower ends along corresponding outer ends of braces 10, and at 15 is a rod passing through and journaled in said arms and braces whereby they are pivotally united. The outer ends of braces 10 are recessed providing an annular rib at $10^b$ receiving the corresponding recessed portions of arms 14 having the annular ribs $14^a$. One or more handle members 16 are secured to rod 15, as by pins 17, whereby said rod may be rotated. Within the space between the rib portions $10^b$ and $14^a$ of braces 10 and arms 14 is located a locking member 18 that is provided with a slot $18^a$ which freely receives rod 15. Said member has a projection $18^b$ operable in a notch $10^c$ in the rib $10^b$ of brace 10 and in a notch $14^b$ in rib $14^a$ of corresponding arm 14. When projection $18^b$ is in both of said notches the parts 10 and 14 will be locked from rotation, and when said projection is out of notch $10^c$ the arms 14 may rotate relatively to braces 10. The shaft 15 is provided with projection or pin $15^a$ operative in an offset portion $18^c$ of slot $18^a$ of the corresponding member 18. Arm 14 is shown provided with a projection 19 adapted to operate with stop 20 on brace 10 to limit forward swinging of member 14 and the back rest toward the seat, and said brace 10 is also provided with a stop 21 spaced from stop 20 to limit the rearward swinging of arms 14 and back rest 11, as indicated in the dotted position in Fig. 1. One or more springs 22 attached to the corresponding part 10 and to rod 15 tend to rotate said rod in such direction as to cause its projection $15^a$ to advance projection $18^b$ into notch 10ᶜ to retain the parts locked. When the back rest is in elevated position the parts will be so related that projection or pin 15ᵃ will operate locking member 18 to cause its projection 18ᵇ to enter notch 10ᶜ in brace 10, (Fig. 3), and thereby, since said projection is then also in notch 14ᵇ of arm 14, the latter will be locked to the brace 10 to retain said back in set position for use, as indicated in Fig. 1. When it is desired to lower the seat back, such as to the position shown in dotted lines in Fig. 1, the handle member 16 is pushed rearwardly whereby projection 15ᵃ is raised to cause raising of member 18 to release its projection 18ᵇ from notch 10ᶜ (Fig. 6) whereby arm 14 is released and may be swung rearwardly. When the back rest is next raised the notch 14ᵇ together with projection 18ᵇ will be moved toward notch 10ᶜ and spring 22 will cause rod 15 to operate projection 15ᵃ to cause member 18 to be moved to cause its projection 18ᵇ to enter recess 10ᶜ to lock the parts together. A projection 15ᵃ with a member 18 and corresponding notches may be coöperative with both arms and braces at the opposite ends of rod 15, or such locking means may be at one end only thereof.

My invention is simple in construction, cheap to manufacture, may be readily operated by anyone, is not liable to get out order, and is efficient in use as providing ready means for attaching and detaching back rests to motor cycle and bicycle seats, as well as permitting the positioning of said back rest according to the desire of the user.

Having thus described my invention, what I claim and desire to secure by Letters Patent is:—

1. The combination of a back rest, braces, a pivot connecting the rest and braces, the back rest and the braces having notches, a locking member having a projection adapted to enter said notches to lock the back rest in operative position on the braces, said pivot being provided with a projection and an operative handle, said locking member having a recess receiving said pivot and projection, whereby the projection of said member may be set in both of said notches to retain the back rest in operative position on the braces and may be withdrawn from one of the notches to permit the back rest to be lowered, and means to secure said braces to a seat.

2. The combination of a back rest, braces, a pivot connecting the rest and braces, the back rest and the braces having notches, a locking member having a projection adapted to enter said notches to lock the back rest in operative position on the braces, said pivot being provided with a projection and an operative handle, said locking member having a recess receiving said pivot and projection, whereby the projection of said member may be set in both of said notches to retain the back rest in operative position on the braces and may be withdrawn from one of the notches to permit the back rest to be lowered, means to secure said braces to a seat, and a spring coöperative between said rod and an adjacent brace to cause the projection of said member to coöperate with both of said notches.

3. The combination of a back rest, spaced braces, means pivotally connecting the back rest to the braces, the back rest and braces having ribs spaced apart, a locking member within the ribs and provided with a projection, the ribs having notches adapted to coincide, said locking member having a projection operative in such notches to lock the back rest in operative position on the braces, means to operate said locking member to release its projection from the notch of the brace, and means to secure the braces to a seat.

4. The combination of a back rest, spaced braces, a rod pivotally connecting said back rest with said braces, the back rest and braces having recessed portions one within another, a locking member in the recess provided with a slot receiving the rod, said slot having an offset portion, said rod having a projection in said offset portion, said member being provided with a projection, the back rest and a brace having notches adapted to coincide to receive said projection of said member to lock the back rest in operative position upon the braces, means to operate the rod to actuate the locking member, and means to secure the braces to a seat.

5. The combination of a back rest, spaced braces, a rod pivotally connecting said back rest with said braces, the back rest and braces having recessed portions one within another, a locking member in the recess provided with a slot receiving the rod, said slot having an offset portion, said rod having a projection in said offset portion, said member being provided with a projection, the back rest and a brace having notches adapted to coincide to receive said projection of said member to lock the back rest in operative position upon the braces, means to operate the rod to actuate the locking member, means to secure the braces to a seat, and a spring connected to the rod and to one of the braces to cause the projection of the locking member to operate in both the adjacent notches.

6. The combination of a back rest, spaced braces, means pivotally connecting the back rest to the braces, the back rest and braces having annular ribs and having recessed portions one within another, a locking member in the recess and provided with a projection, the ribs having notches adapted to coincide, said locking member having a projection operative in such notches to lock the back rest in operative position on the braces, means to operate said locking member to release its projection from the notch of the brace, and means to secure the braces to a seat, the back rest having a projection, one of the braces having spaced stops coöperative with said projection to respectively limit the forward and backward position of the back rest.

Signed at New York in the county of New York and State of New York this 3rd day of July, A. D. 1919.

HORACE N. SPEER.